United States Patent
Hibino et al.

[11] Patent Number: 5,570,148
[45] Date of Patent: Oct. 29, 1996

[54] FLASH CONTROL APPARATUS

[75] Inventors: Hideo Hibino; Hiroshi Sakamoto; Seiichi Yasukawa, all of Kawasaki, Japan

[73] Assignee: Nikon Corporation, Tokyo, Japan

[21] Appl. No.: 364,393

[22] Filed: Dec. 23, 1994

Related U.S. Application Data

[63] Continuation of Ser. No. 168,359, Dec. 17, 1993, abandoned, which is a continuation of Ser. No. 917,369, Jul. 23, 1992, abandoned.

[30] Foreign Application Priority Data

Jul. 30, 1991 [JP] Japan .................... 3-066837 U

[51] Int. Cl.⁶ .................... G03B 15/02; G03B 15/03
[52] U.S. Cl. .................... 396/182; 396/180
[58] Field of Search .................... 354/129, 132, 354/145.1, 149.11, 126, 415

[56] References Cited

U.S. PATENT DOCUMENTS

| | | | |
|---|---|---|---|
| 4,552,443 | 11/1985 | Broida | 354/132 |
| 4,608,522 | 8/1986 | Yuasa et al. | 354/132 |
| 4,717,861 | 1/1988 | Yuasa et al. | 354/132 |
| 4,771,301 | 9/1988 | Yamada | 354/132 |
| 4,797,702 | 1/1989 | Taniguchi et al. | 354/413 |
| 4,897,684 | 1/1990 | Serikawa | 354/416 |
| 5,016,037 | 5/1991 | Taniguchi et al. | 354/413 |
| 5,164,759 | 11/1992 | Yasukawa | 354/415 |

FOREIGN PATENT DOCUMENTS

| | | |
|---|---|---|
| 56-154718 | 11/1981 | Japan . |
| 57-93335 | 6/1982 | Japan . |
| 57-128327 | 8/1982 | Japan . |
| 58-9130 | 1/1983 | Japan . |
| 58-62634 | 4/1983 | Japan . |
| 58-62633 | 4/1983 | Japan . |
| 58-108521 | 6/1983 | Japan . |
| 59-62839 | 4/1984 | Japan . |

*Primary Examiner*—Michael L. Gellner
*Assistant Examiner*—Nicholas J. Tuccillo
*Attorney, Agent, or Firm*—Shapiro and Shapiro

[57] ABSTRACT

A flash control apparatus for causing a plurality of electronic flash devices to emit light in synchronism with the shutter opening operation of a camera comprises a plurality of synchro terminals connected to the plurality of electronic flash devices, respectively, a trigger device connected correspondingly to the plurality of synchro terminals for transmitting a light emission signal to the plurality of electronic flash devices at a certain timing, a timing selecting device for selecting the aforementioned timing from among a plurality of predetermined timings during the shutter opening operation, an electronic flash device selecting device for selecting an electronic flash device which should be caused to emit light from among the plurality of electronic flash devices, and a control device for controlling the trigger device on the basis of the result of the selection by the timing selecting device and the electronic flash device selecting device.

10 Claims, 8 Drawing Sheets

FLASH CONTROL APPARATUS

This is a continuation of application Ser. No. 08/168,359 filed Dec. 17, 1993, now abandoned, which is a continuation of application Ser. No. 07/917,369 filed Jul. 23, 1992, abandoned.

BACKGROUND OF THE INVENTION

1. Field of the Invention

This invention relates to a flash control apparatus on which an electronic flash device is mountable.

2. Related Background Art

It has heretofore been possible to drive discrete electronic flash devices mounted on the hot shoe and the synchro terminal of a camera at the same time, but there has been no camera which can drive such electronic flash devices independently of each other.

Also, when continuous photographing is to be effected by the use of an electronic flash device, the charging time of the electronic flash device is long and continuous photographing as desired cannot be effected, and an extraneous power source is used to shorten the charging time.

In the prior art, the synchro terminals of an electronic flash device mounted on a hot shoe and an electronic flash device mounted on a synchro terminal are merely parallel-connected in a camera body, and this has led to a problem that the electronic flash device mounted on the hot shoe and the electronic flash device mounted on the synchro terminal cannot be controlled from the camera body so as to emit light singly or emit light independently with a time lag therebetween and can only be controlled so as to emit light at the same time.

Further, when an attempt is made to cause the electronic flash device mounted on the hot shoe and the electronic flash device mounted on the synchro terminal to emit light singly, it has been necessary to remove the electronic flash device which should not be caused to emit light or to open the power source switch of the electronic flash device so as not to emit light, and this has led to a problem that the operation is very cumbersome.

As already noted the charging time of an electronic flash device is long and continuous photographing using an electronic flash device could not be accomplished as desired. Also, an attempt to shorten the charging time of the electronic flash device has made it necessary to supply an extraneous power source. However, the extraneous power source is bulky and bad in form, and further the shortening of the charging time has been limited in its possibility.

Besides the method of shortening the charging time of the electronic flash device by using an extraneous power source, a method of shortening the charging time of the electronic flash device in practical use will be considered hereinafter. For example, if two electronic flash devices are caused to emit light alternately during each cycle of photographing, the average charging time can be reduced to half. However, if the two electronic flash devices are merely connected together as in increased light photographing, the two devices will emit light at the same time and the purpose cannot be achieved.

Also, when an attempt is made to photograph with an electronic flash device mounted only on the synchro terminal, the synchro contacts of the hot shoe and the synchro terminal are connected together in the camera body. Therefore the electronic flash device may contact with the synchro terminal of the hot shoe side, which is exposed outside the camera body, thereby erroneously emit light. Also, when an electronic flash device from which a high voltage is output to the synchro terminal is mounted on the synchro terminal, there has been the possibility of the photographer touching the synchro contact of the hot shoe side by mistake and receiving an electric shock.

As means for solving this problem, it has been necessary to cover the hot shoe with a cap and prevent the contact with the synchro terminal, or to provide a switch between the synchro contact of the hot shoe side and the synchro contact of the synchro terminal side, and further provide a mechanism by which the switch is closed to connect the synchro contacts of the hot shoe and the synchro terminal only when an electronic flash device is mounted on the hot shoe.

SUMMARY OF THE INVENTION

It is an object of the present invention to provide independently in a camera body means for driving an electronic flash device mounted on a hot shoe and an electronic flash device mounted on a synchro terminal, and further provide means for enabling the simultaneous light emission of the plurality of electronic flash devices, the light emission of the electronic flash devices with any time lag, and the light emission of only a selected one of the plurality of electronic flash devices, thereby controlling the plurality of electronic flash devices independently of each other.

It is another object of the present invention to provide independently in a camera body means for driving an electronic flash device mounted on a hot shoe and an electronic flash device mounted on a synchro terminal, thereby controlling the electronic flash devices so as to emit light alternately during each cycle of photographing.

It is still another object of the present invention to provide independently in a camera body means for driving an electronic flash device mounted on a hot shoe and an electronic flash device mounted on a synchro terminal, thereby preventing an erroneous operation such as erroneous light emission and electric shocks without providing any special mechanism as described above.

To achieve the above objects, the present invention is provided with a plurality of synchro terminals for connecting a plurality of electronic flash devices together, trigger means connected correspondingly to said plurality of synchro terminals for transmitting the timing of light emission to each of said plurality of electronic flash devices, synchronizing timing setting means for selecting and setting the timing of light emission from among a plurality of predetermined timings when a shutter is fully open, electronic flash device selecting means for selecting an electronic flash device to be caused to emit light from among said plurality of electronic flash devices, and control means for controlling said trigger means on the basis of synchronizing timing setting information set by said synchronizing timing setting means during shutter release and electronic flash device selection information selected by said electronic flash device selecting means.

The plurality of electronic flash devices can be connected together and the light emission timings of the electronic flash devices are controlled independently of each other on the basis of the synchronizing timing setting information and the electronic flash device selection information. As a result, it is avoided that for example, the photographer touches the synchro contact of the hot shoe side by mistake. Also, if the light emission timing of each electronic flash device is staggered, one of the electronic flash devices can be charged in preparation for the next light emission while the other electronic flash device is emitting light and accordingly, the charging time of the electronic flash device is shortened and continuous photographing becomes possible.

DESCRIPTION OF THE PREFERRED EMBODIMENTS

Figure 1:
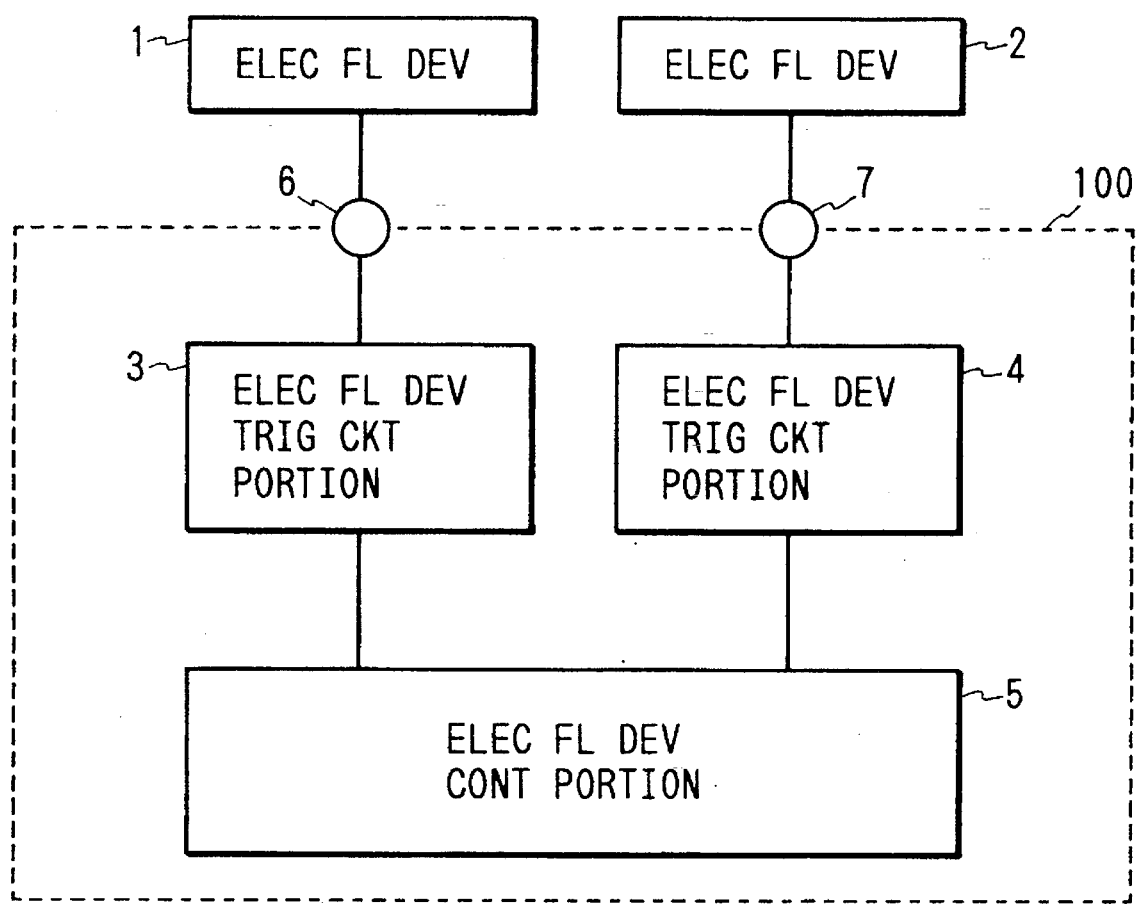
FIG. 1 is a block diagram showing an embodiment of the flash photographing apparatus of the present invention.

FIG. 1 is a block diagram showing the concept of the present invention.

The construction of the present invention comprises two electronic flash devices 1 and 2, electronic flash device trigger circuit portions 3 and 4 for triggering the electronic flash devices 1 and 2 independently of each other, an electronic flash device control portion 5 for controlling the electronic flash device trigger circuit portions 3 and 4, and contacts 6 and 7 for connecting the electronic flash devices 1 and 2 to a camera body 100. This construction is designed such that two electronic flash devices 1 and 2 are controlled, but a single electronic flash device or a plurality of electronic flash devices are likewise controllable. Also, in the present embodiment, the electronic flash devices 1 and 2 are designed to be mounted on the exterior of the camera, but alternatively, they may be designed to be contained in the camera body, and the operation in that case is the same as that of the illustrative construction and therefore need not be described. Also, in the present embodiment, reference is made to a shutter using a leading shutter curtain and a trailing shutter curtain, but alternatively, use may be made of a construction which effects the shutter operation in a slit-like form, and in that case, flashing may sometimes start before the shutter opening operation.

Figure 2:
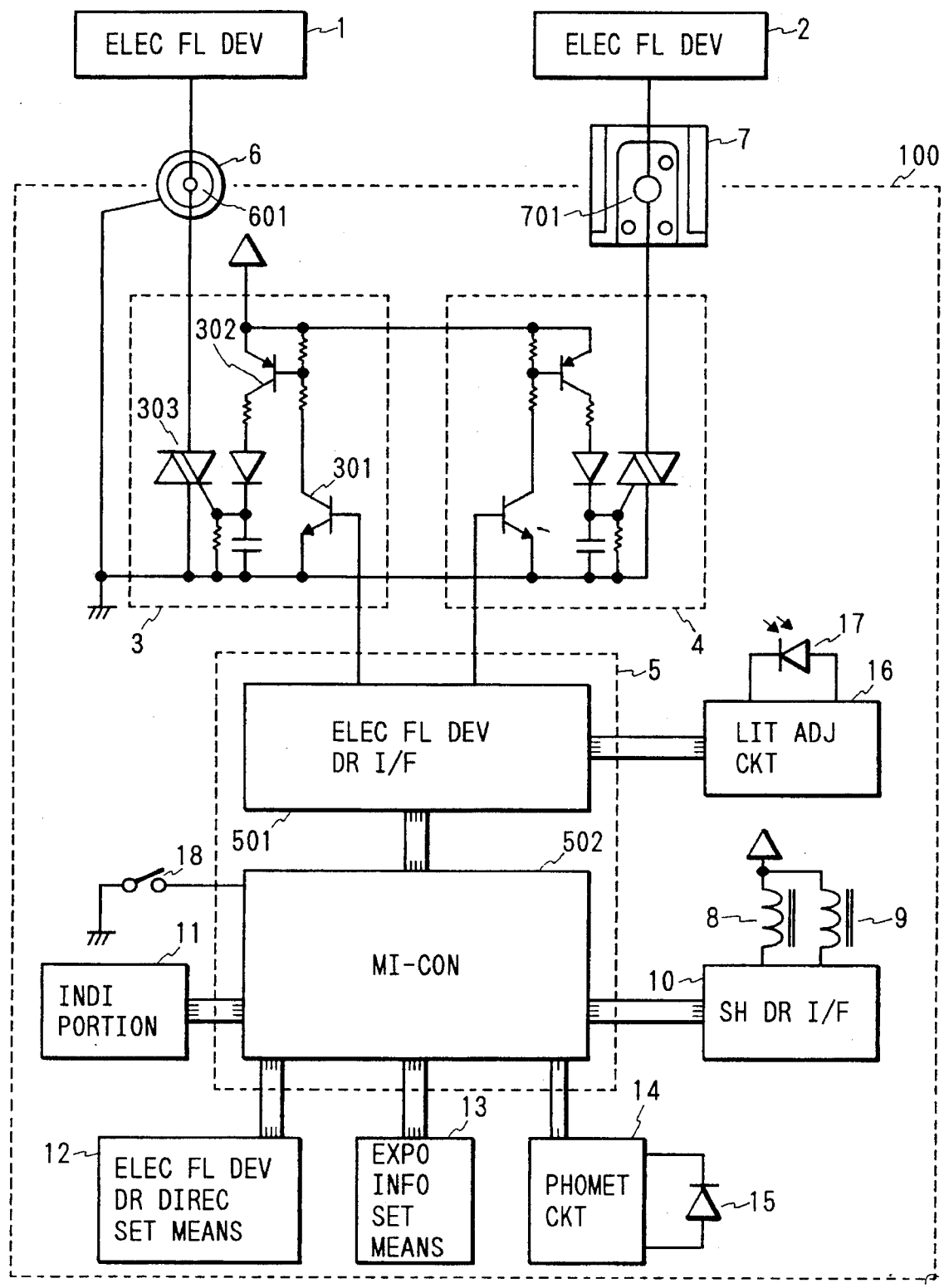
FIG. 2 is a block diagram of the specific construction of said flash photographing apparatus.

FIG. 2 is a block diagram showing a circuit construction in an embodiment of the present invention based on the concept shown in FIG. 1.

The camera body 100 comprises, with a microcomputer 502 as core, electronic flash device driving direction setting means 12, exposure information setting means 13, an indicating portion 11, a release switch 18, a shutter driving I/F 10 for driving shutter magnets 8 and 9 by a signal from the microcomputer 502, a photometry circuit 14 having a light receiving element 15 as an input, an electronic flash device trigger circuit portion 3 for driving the synchro terminal 601 of a synchro terminal 6, an electronic flash device trigger circuit portion 4 for driving the synchro terminal 701 of a hot shoe 7, an electronic flash device driving I/F 501 for controlling the electronic flash device trigger circuit portions 3 and 4 by a signal from the microcomputer, and a light adjusting circuit 16 connected to the electronic flash device driving I/F 501 and having a light receiving element 17 as an input.

However, the electronic flash device driving I/F 501 is not always necessary if a signal from the light adjusting circuit can be directly received by the microcomputer 502 and further the electronic flash device trigger circuit portions 3 and 4 can be directly controlled by the microcomputer 502.

The electronic flash device driving direction setting means 12 is means for inputting information as to at what timing the electronic flash devices mounted on the synchro terminal 6 and the hot shoe 7 should be caused to emit light, for example, whether the two electronic flash devices should be caused to emit light at the same time, whether only one of the two electronic flash devices should be caused to emit light, or whether the two electronic flash devices should be caused to emit light with a time lag, and information for the timing of light emission, i.e., as to either leading curtain synchro in which the synchronizing timing is synchronized with the leading curtain or trailing curtain synchro in which the synchronizing timing is synchronized with the trailing curtain.

Also, the exposure information setting means 13 is means for setting the information regarding exposure such as exposure mode changeover, film speed, shutter speed, aperture value and exposure correction value, and such information is indicated by the indicating portion 11.

Means for transmitting the synchronizing timing to the electronic flash devices is effected by dropping the synchro terminal 601 to "L" in the case of the synchro terminal 6, and by dropping the hot shoe terminal 701 to "L" in the case of the hot shoe 7. The driving of such synchro terminals is effected by the electronic flash device trigger circuit portions 3 and 4.

Description will now be made of the operation of driving the synchro terminal by the use of the internal circuit of the electronic flash device trigger circuit portion 3.

The counting of the time for which the electronic flash device is caused to emit light or the monitoring of the timing at which the electronic flash device is tuned is first effected by the microcomputer 502, and when the counted time is a preset time or the synchronizing timing is reached, an electronic flash device driving command (in this case, a light emission command) is transmitted to the electronic flash device driving I/F 501. In accordance with this electronic flash device driving command, the electronic flash device driving I/F 501 renders the base of a transistor 301 in the electronic flash device trigger circuit portion 3 "H", thereby turning on the transistor 301. Thereby a transistor 302 is turned on, and a signal current is given to the gate of a triac 303 to thereby trigger the triac 303 and turn on the triac 303. By the triac 303 being turned on, the synchro terminal 601 of the synchro terminal 6 is rendered into "L", and transmits the synchronizing timing to the electronic flash device. In the case of the electronic flash device mounted on the hot shoe 7, a light emission command signal is transmitted in a similar manner.

Figure 3:
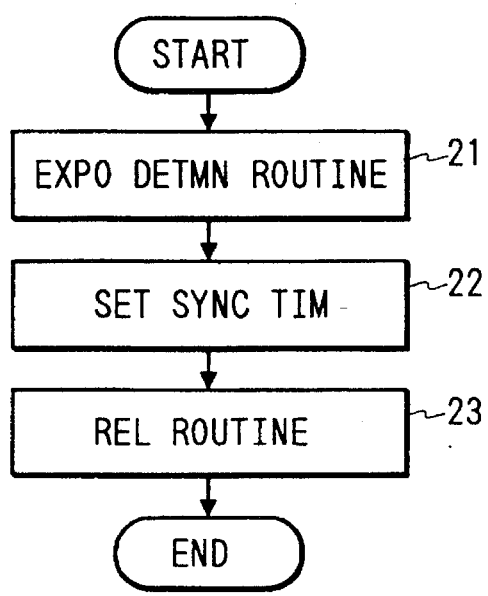
FIG. 3 is a flow chart showing the operation of said flash photographing apparatus.
Figure 4:
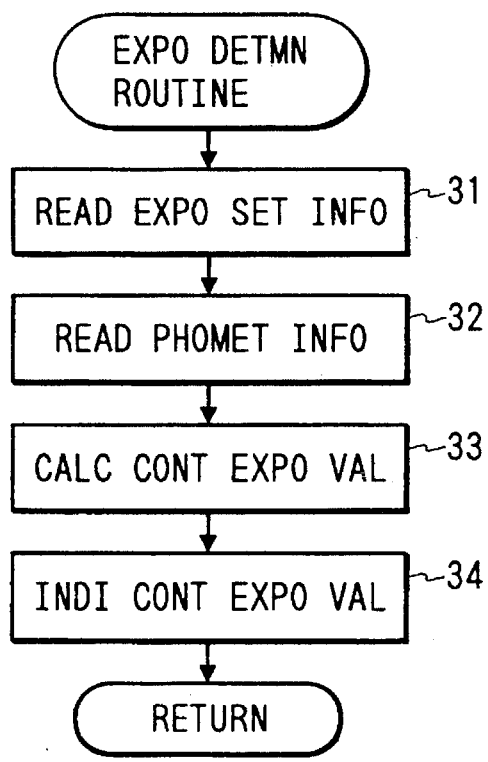
FIG. 4 is a flow chart showing the operation of said flash photographing apparatus.
Figure 5:
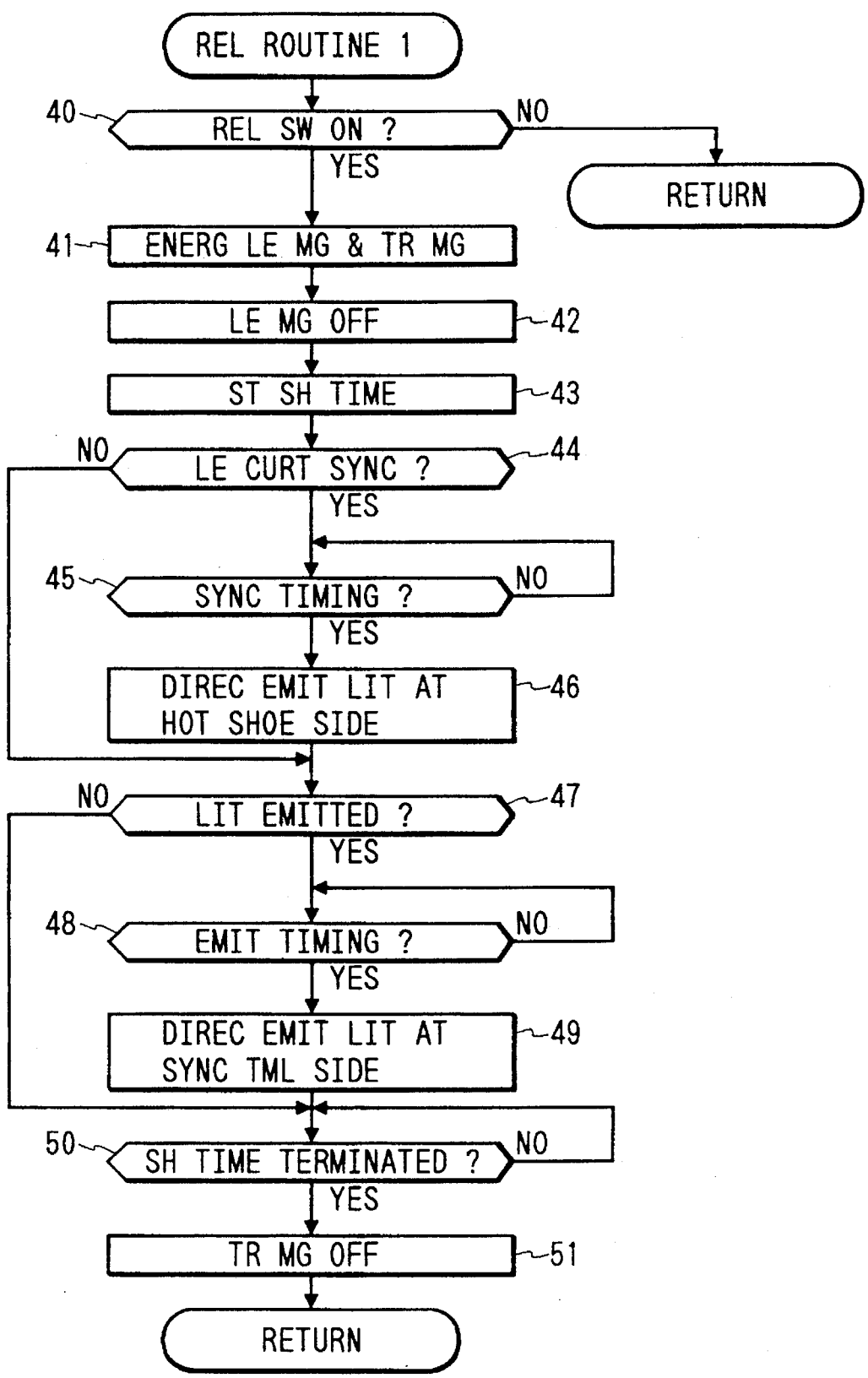
FIG. 5 is a flow chart showing a first embodiment of the release operation of said flash photographing apparatus.

FIGS. 3 to 5 are flow charts showing the operation of the present embodiment.

The general of the operation of driving the electronic flash devices will now be described with reference to FIG. 3. First, in the exposure determination routine of a step 21, exposure is determined, and subsequently, in the electronic flash device synchronizing timing setting of a step 22, the light emission timing is set by the electronic flash device driving direction setting means 12. The parameters set by the electronic flash device synchronizing timing setting of this step 22 are which of the electronic flash devices should be caused to emit light and the light emission timing thereof, such as whether the electronic flash device mounted on the hot shoe 7 should be caused to emit light, whether the electronic flash device mounted on the synchro terminal 6 should be caused to emit light, whether both of the two electronic flash devices should be caused to emit light, and whether the synchronizing timing is the leading curtain synchro or the trailing curtain synchro. On the basis of this setting, the electronic flash device is driven in the release routine of a step 23.

Here, the exposure determination routine of the step 21 will be described with reference to the flow chart of FIG. 4. At a step 31, the microcomputer 502 in the camera body 100 reads from the exposure information setting means 13 the set information regarding the exposure, i.e., the film speed set by the photographer, the exposure mode (either automatic or manual, and the automatic exposure method), and the aperture and shutter speed depending on the exposure mode, and the exposure correction value, etc. At a step 32, the microcomputer 502 reads the result of photometry, i.e., the luminance information of the object, from the photometry circuit 14. At a step 33, the microcomputer 502 calculates a controlled exposure value from said exposure set information and said photometry information, and at a step 34, said controlled exposure value is indicated by the indicating portion 11.

The release routine (release routine 1) executed at a step 23 will now be described with reference to the flow chart of FIG. 5 as well as FIG. 8. When a release switch 18 is depressed by the photographer, the microcomputer 502 in the camera body 100 detects that the release switch 18 has been closed, and the shutter release operation is started. In this case, the leading curtain and trailing curtain of the shutter continue to be restrained even when the mechanical restraint thereof is released and therefore, at a step 41, the shutter driving I/F 10 is instructed to electrically energize a leading magnet 8 and a trailing magnet 9 (the point a of FIG. 8). After the lapse of a predetermined time, a mechanical member which has so far restrained the leading and trailing curtains of the shutter is released and when mirror up, etc. are terminated, at a step 42, the microcomputer 502 instructs the shutter driving I/F 10 to deenergize the leading magnet 8 to start the exposure of film (the point b of FIG. 8), and at the same time, at a step 43, the counting of the shutter time is started.

At a step 44, if the leading curtain synchro is set by the electronic flash device synchronizing timing setting of the step 22, the synchronizing timing of a step 45 is waited for. If the leading curtain synchro is not set, the microcomputer 502 continues to count the shutter time, and after the expiration of the shutter time, advance is made to the trailing magnet OFF of a step 51. If the leading curtain synchro is set, at the step 45, the synchronizing timing is waited for and if the synchronizing timing is reached, at a step 46, the microcomputer 502 instructs the electronic flash device driving I/F 501 to cause the electronic flash device to emit light on the basis of the electronic flash device this is undesirable. By contrast obtained at the step 22 (the point c of FIG. 8). The thus instructed electronic flash device driving I/F 501 drives the electronic flash device trigger circuit 3 to thereby cause the electronic flash device on the hot shoe side to emit light.

After the light emission of the electronic flash device, the microcomputer 502 continues to count the shutter time, and at a step 47, if the electronic flash device at the synchro terminal side should be caused to emit light, the light emission timing of a step 48 is waited for. If said electronic flash device is to be caused to emit light, advance is made to await the shutter time termination at a step 50. If the electronic flash device at the synchro terminal side should be caused to emit light, at the step 48, the light emission timing is waited for and the microcomputer 502 instructs the electronic flash device driving I/F 501 to cause the electronic flash device to emit light on the basis of the electronic flash device synchronizing timing setting information obtained at the step 22 (the point e of FIG. 8). The thus instructed electronic flash device driving I/F 501 drives the electronic flash device trigger circuit 4 to thereby cause the electronic flash device at the synchro terminal side to emit light. After the light emission, at a step 51, the trailing magnet is turned off, thus terminating the release routine (the point f of FIG. 8).

Figure 6:
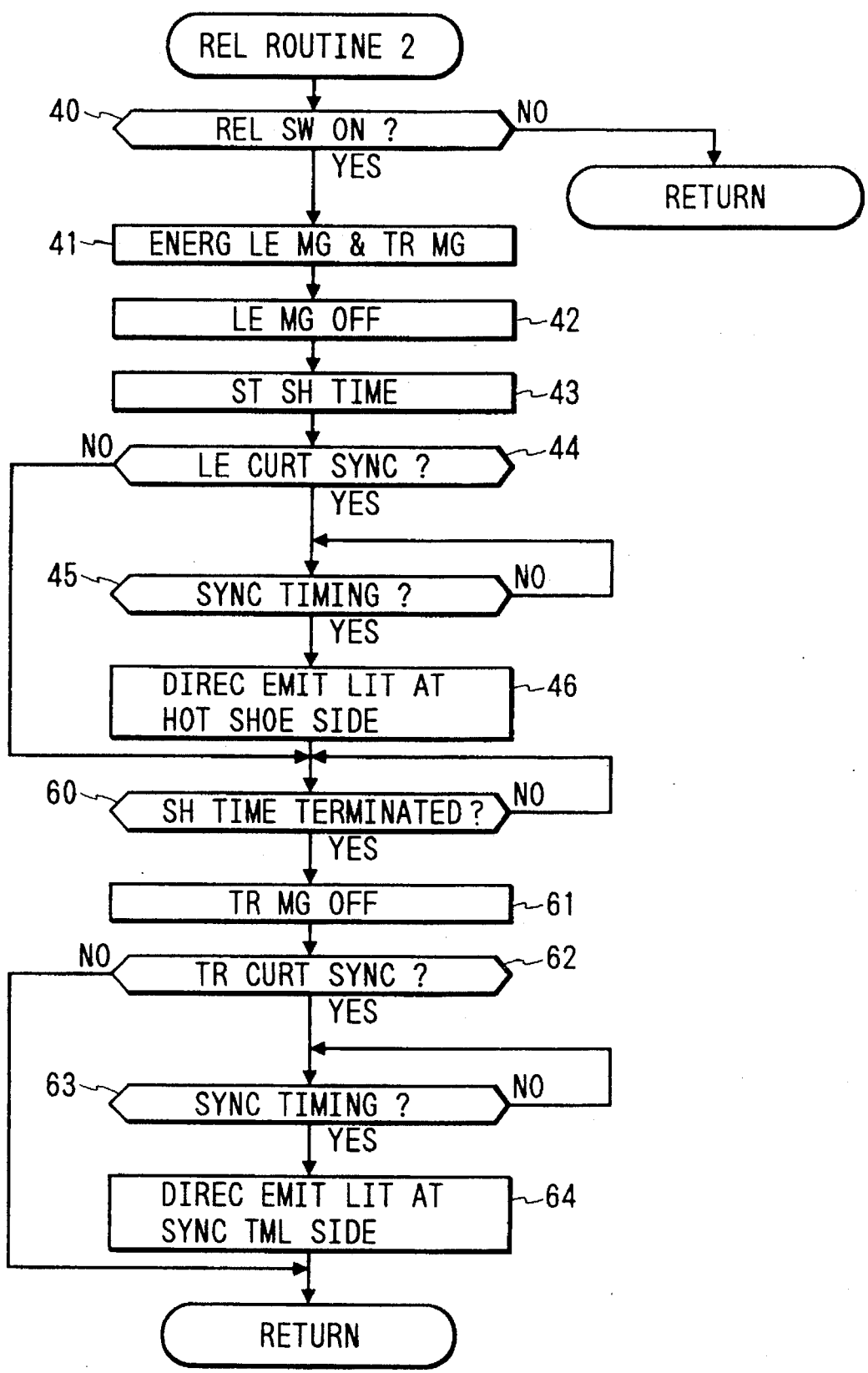
FIG. 6 is a flow chart showing a second embodiment of the release operation of said flash photographing apparatus.

Release routine 2 which is a second embodiment will now be described with reference to the flow chart of FIG. 6 as well as FIG. 9. When the release switch 18 is depressed by the photographer, the microcomputer 502 in the camera body 100 detects that the release switch 18 has been closed, and starts the shutter release operation. In this case, the leading curtain and trailing curtain of the shutter continue to be restrained even when the mechanical restraint thereof is released and therefore, the microcomputer 502 instructs the shutter driving I/F 10 to electrically energize the leading magnet 8 and the trailing magnet 9 (the point a of FIG. 9). After the lapse of a predetermined time, the mechanical member which has so far restrained the leading curtain and trailing curtain of the shutter is released and when mirror up, etc. are terminated, at a step 42, the microcomputer 502 instructs the shutter driving I/F 10 to deenergize the leading magnet 8 to start the exposure of the film (the point b of FIG. 9) and at the same time, at a step 43, the microcomputer starts the counting of the shutter time.

At a step 44, if the leading curtain synchro is set by the electronic flash device synchronizing timing setting of the step 22, the synchronizing timing of a step 45 is waited for, and if the leading curtain synchro is not set, the microcomputer 502 continues to count the shutter time, and after the expiration of the shutter time, advance is made to the trailing curtain magnet off step 61. If the leading curtain synchro is set, the synchronizing timing is waited for at a step 45, and if the synchronizing timing is reached, at a step 46, the microcomputer 502 instructs the electronic flash device driving I/F 501 to cause the electronic flash device to emit light on the basis of the electronic flash device synchronizing timing setting information obtained at the step 22 (the point c of FIG. 9). The thus instructed electronic flash device driving I/F 501 drives the electronic flash device trigger circuit 3 to thereby cause the electronic flash device at the hot shoe side to emit light.

After the light emission of the electronic flash device, the microcomputer 502 continues to count the shutter time, and at a step 60, the shutter time is terminated, whereafter at a step 61, the microcomputer instructs the shutter driving I/F 10 to deenergize the trailing magnet 9 (the point d of FIG.

9). At a step 62, if the trailing curtain synchro is not set by the electronic flash device synchronizing timing setting of the step 22, the trailing curtain is closed and the release routine is terminated. If the trailing curtain synchro is set, the synchronizing timing is waited for at a step 63 and if the synchronizing timing is reached, at a step 64, the microcomputer 502 instructs the electronic flash device driving I/F 501 to cause the electronic flash device to emit light on the basis of the electronic flash device synchronizing timing setting information obtained at the step 22 (the point e of FIG. 9). The thus instructed electronic flash device driving I/F 501 drives the electronic flash device trigger circuit 4 to thereby cause the electronic flash device at the synchro terminal side to emit light. After the light emission, the trailing curtain is closed and the release routine is terminated (the point f of FIG. 9).

Figure 7:
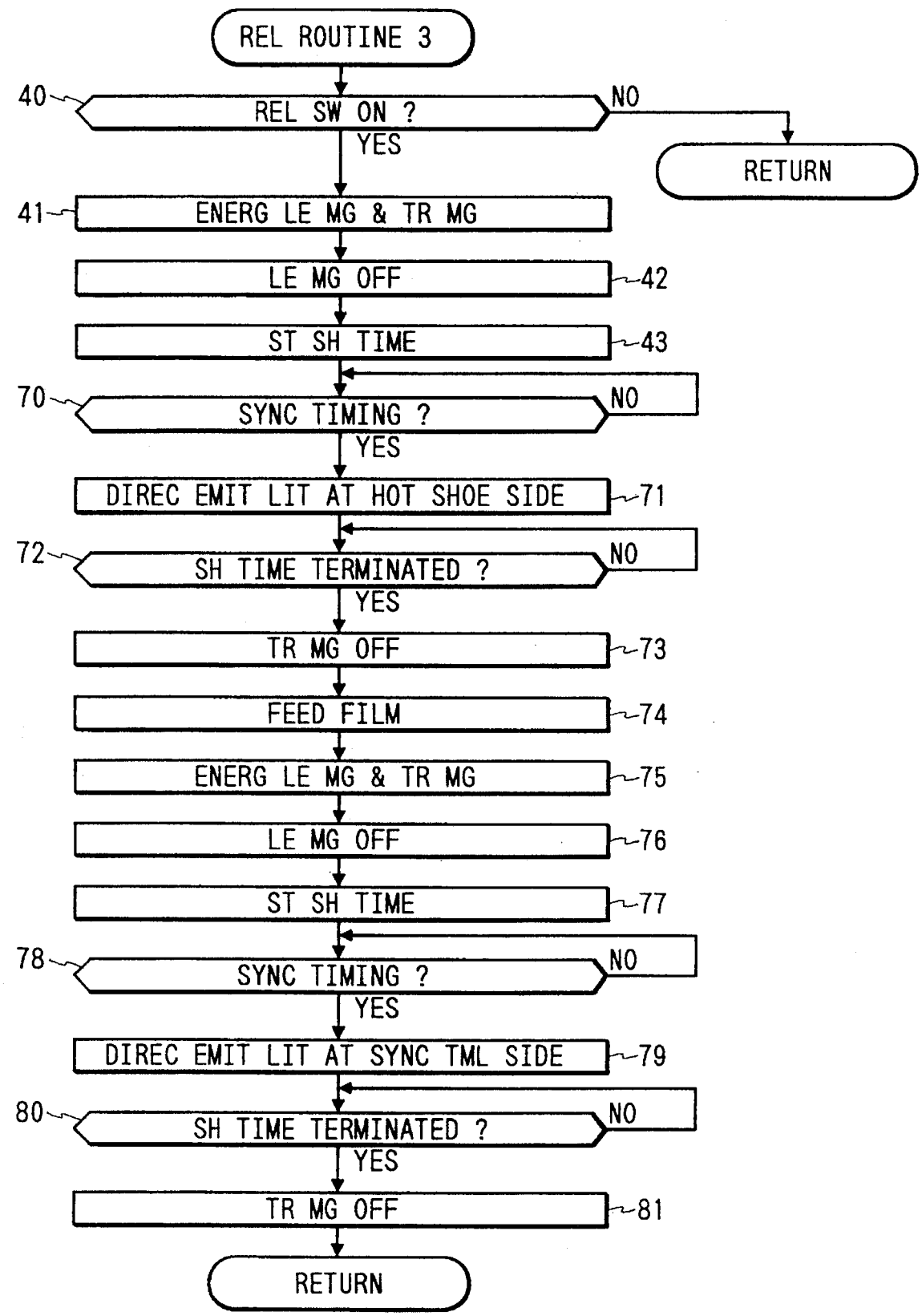
FIG. 7 is a flow chart showing a third embodiment of the release operation of said flash photographing apparatus.

Release routine 3 of the second embodiment applied to continuous photographing or the like will now be described with reference to the flow chart of FIG. 7 as well as FIG. 10. When the release switch 18 is depressed by the photographer, the microcomputer in the camera body 100 detects that the release switch 18 has been closed, and starts the shutter release operation. In this case, the leading curtain and trailing curtain of the shutter continue to be restrained even when the mechanical restraint thereof is released and therefore, at a step 41, the microcomputer instructs the shutter driving I/F 10 to electrically energize the leading magnet 8 and the trailing magnet 9 (the point a of FIG. 10). After the lapse of a predetermined time, the mechanical member which has so far restrained the leading curtain and trailing curtain of the shutter is released and when mirror up, etc. are terminated, at a step 42, the microcomputer 502 instructs the shutter driving I/F 10 to deenergize the leading magnet 8 to start the exposure of the film (the point b of FIG. 10) and at the same time, at a step 43, the microcomputer starts to count the shutter time.

Figure 9:
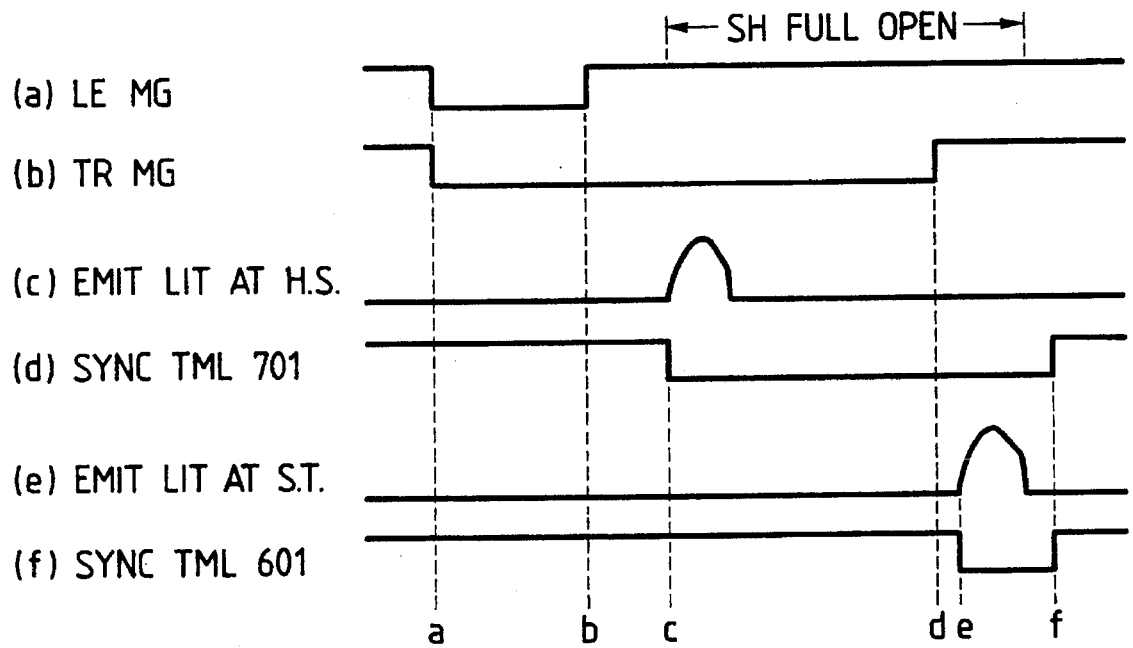
FIG. 9 is a timing chart showing the second embodiment of the release operation of said flash photographing apparatus.
Figure 10:
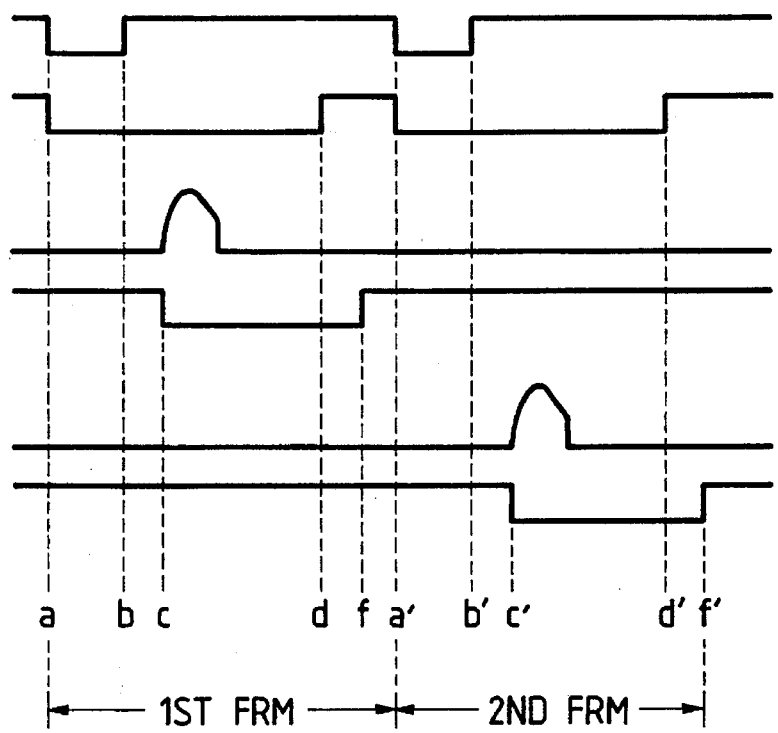
FIG. 10 is a timing chart showing the third embodiment of the release operation of said flash photographing apparatus.

At a step 70, the synchronizing timing is waited for, and when the synchronizing timing is reached, at a step 71, the microcomputer 502 instructs the electronic flash device driving I/F 501 to cause the electronic flash device to emit light on the basis of the electronic flash device synchronizing timing setting information obtained at the step 22 (the point c of FIG. 10). The thus instructed electronic flash device driving I/F 501 drives the electronic flash device trigger circuit 3 to thereby cause the electronic flash device at the hot shoe side to emit light. After the light emission of the electronic flash device, the microcomputer 502 continues to count the shutter time, and at a step 72, the shutter time is terminated, whereafter at a step 73, the microcomputer 502 instructs the shutter driving I/F 10 to deenergize the trailing magnet 9 (the point d of FIG. 9). After the light emission, the trailing curtain is closed and at a step 74, the feeding of the film is effected, thus terminating the release routine for the first frame (the point f of FIG. 10).

When the release switch is further depressed after the feeding of the film, the exposure of the second frame is effected. A process similar to that for the first frame is carried out at steps 75–77, and the synchronizing timing of a step 78 is waited for, and if the synchronizing timing is reached, at a step 79, the microcomputer 502 instructs the electronic flash device driving I/F 501 to cause the electronic flash device to emit light on the basis of the electronic flash device synchronizing timing setting information obtained at the step 22 (the point c' of FIG. 10). The thus instructed electronic flash device driving I/F 501 drives the electronic flash device trigger circuit 4 to thereby cause the electronic flash device at the synchro terminal side, which is different from the electronic flash device for the first frame, to emit light. Thereafter, a process similar to that for the first frame is carried out, thus terminating the release routine.

Figure 8:
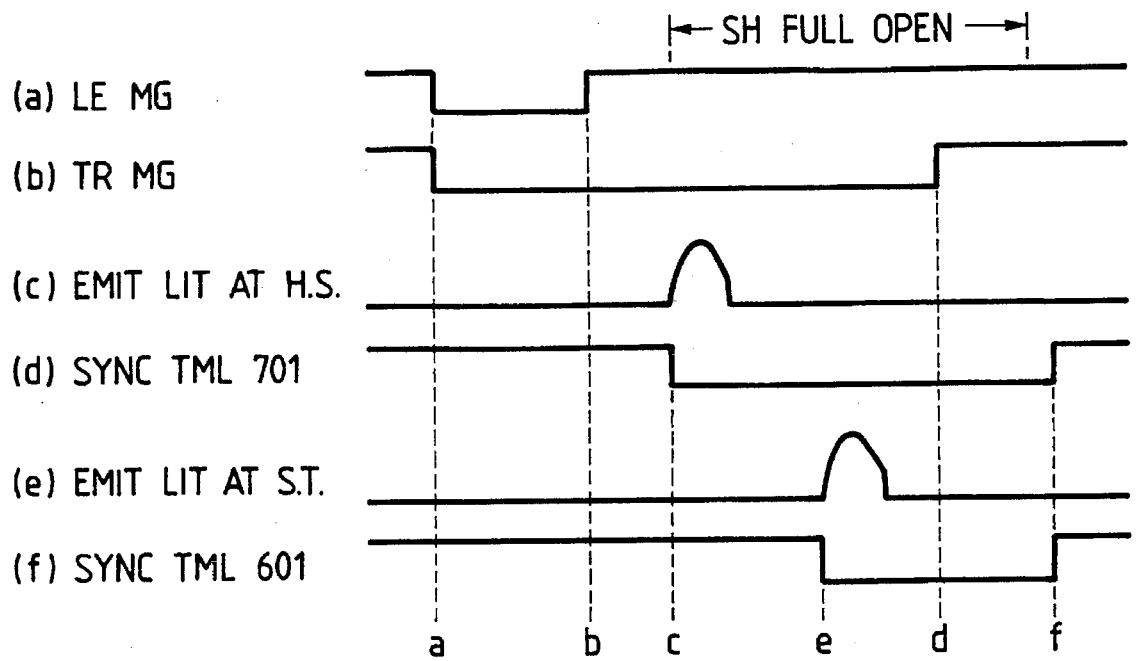
FIG. 8 is a timing chart showing the first embodiment of the release operation of said flash photographing apparatus.

FIGS. 8 to 10 are timing charts showing the embodiments of the present invention.

FIG. 8 shows an embodiment in which the electronic flash device mounted at the hot shoe 7 side and the electronic flash device mounted at the synchro terminal 6 side are caused to emit light not at the same time, but with a time lag, and this embodiment can accomplish multiplex photographing and multiflash photographing.

FIG. 9 shows an application of FIG. 8 in which leading curtain synchro is effected by the electronic flash device mounted at the hot shoe 7 side and trailing curtain synchro is effected by the electronic flash device mounted at the synchro terminal 6 side.

FIG. 10 shows an embodiment in which as successive frame are is exposed, the electronic flash device mounted at the hot shoe 7 side and the electronic flash device mounted at the synchro terminal 6 side are alternately caused to emit light. The merit of this technique as compared to the prior art will be readily appreciated. When continuous photographing is to be effected by the use of a single electronic flash device as in the prior art, after the first light emission, a long time has been required until the second light emission due to the charging time of the capacitor of the electronic flash device this is undesirable. By contrast, the use of two electronic flash devices according to the invention as just described reduces the effective recycle time thereof to apparently half and continuous photographing becomes practical. An example in which two electronic flash devices are used has been shown herein, but by providing a greater number of electronic flash devices which can be driven, the effective recycle time can of course be correspondingly shortened, whereby the frame speed during continuous photographing can be increased.

According to the present invention, for example, the electronic flash device mounted on the hot shoe and the electronic flash device mounted on the synchro terminal can be caused to emit light independently of each other. Therefore the electronic flash device mounted on the hot shoe and the electronic flash device mounted on the synchro terminal can be caused to emit light alternately during each cycle of photographing, whereby the effective flash recycle time can be greatly shortened. For example, full light emission can be accomplished by two shots, and also when continuous photographing is to be effected by motor driving or the like, a synchronizing speed double that in the prior art becomes possible. Further, a combination of a greater number of electronic flash devices can be used and the synchronizing speed for continuous photographing will be greatly improved. Furthermore, the use of a plurality of electronic flash devices decreases the load per electronic flash device, and for example, even if light emission is repeated continually, it can be expected that the heat generation of the light emitting portions will be mitigated and trouble will be obviated.

What is claimed is:

1. A flash control apparatus of a camera system that includes a camera having a leading shutter curtain and a trailing shutter curtain and a mechanism for releasing said shutter curtains, said flash control apparatus comprising:

a plurality of synchro terminals for connection, respectively, to a plurality of electronic flash devices;

an electronic flash device setting circuit which variably sets timing of triggering the electronic flash devices, said setting circuit being operative to changeably set an interval between respective triggering timings for successive light emissions by two of the plurality of electronic flash devices;

a control circuit which generates a corresponding plurality of start signals individually, in accordance with the timing set by said setting circuit, and having a plurality of output lines corresponding to said plurality of start signals; and a plurality of trigger circuits each electrically connecting one of said output lines to the corresponding synchro terminal and applying to the synchro terminal, in response to a start signal received on said one output line, a light emission signal to cause an electronic flash device connected to the synchro terminal to emit light, whereby the plurality of electronic flash devices emit light in accordance with the timing set by said setting circuit, wherein said control circuit is connected to said mechanism for releasing said shutter curtains and has a mode to output a start signal to one of said trigger circuits in association with release of said leading shutter curtain and to output another start signal to another of said trigger circuits in association with release of said trailing shutter curtain.

2. A flash control apparatus according to claim 1, wherein said control circuit has a mode to output start signals to said plurality of trigger circuits at different times during one shutter operation.

3. A flash control apparatus according to claim 1, wherein one of said synchro terminals is associated with a hot shoe.

4. A flash control apparatus of a camera system that includes a camera having a leading shutter curtain and a trailing shutter curtain, said flash control apparatus comprising:

a plurality of synchro terminals for connection, respectively, to a plurality of electronic flash devices;

an electronic flash device setting circuit which variably sets timing of triggering the electronic flash devices, said setting circuit being operative to changeably set an interval between respective triggering timings for successive light emissions by two of the plurality of electronic flash devices;

a control circuit which generates a corresponding plurality of start signals individually, in accordance with the timing set by said setting circuit, and having a plurality of output lines corresponding to said plurality of start signals; and a plurality of trigger circuits each electrically connecting one of said output lines to the corresponding synchro terminal and applying to the synchro terminal, in response to a start signal received on said one output line, a light emission signal to cause an electronic flash device connected to the synchro terminal to emit light, whereby the plurality of electronic flash devices emit light in accordance with the timing set by said setting circuit, wherein said control circuit additionally detects when successive frames are being photographed and has a mode to output a start signal to a different triggering circuit for each of the successive frames.

5. A flash control apparatus according to claim 4, wherein said plurality of trigger circuits is constituted by only two trigger circuits, and said control circuit has a mode to output start signals alternately to said two trigger circuits to effect photographing of a succession of frames with a different flash device for each frame.

6. A flash control apparatus, which is built in a camera body having a leading shutter curtain and a trailing shutter curtain and a mechanism for releasing said shutter curtains, and which comprises:

a plurality of synchro terminals for connection, respectively, to a plurality of electronic flash devices;

an electronic flash device setting circuit which variably sets timing of triggering the electronic flash devices, said setting circuit being operative to changeably set an interval between respective triggering timings for successive light emissions by two of the plurality of electronic flash devices;

a control circuit which generates a corresponding plurality of start signals individually, in accordance with the timing set by said setting circuit, and having a plurality of output lines corresponding to said plurality of start signals; and a plurality of trigger circuits each electrically connecting one of said output lines to the corresponding synchro terminal and applying to the synchro terminal, in response to a start signal received on said one output line, a light emission signal to cause an electronic flash device connected to the synchro terminal to emit light, whereby the plurality of electronic flash devices emit light in accordance with the timing set by said setting circuit, wherein said control circuit is connected to said mechanism for releasing said shutter curtains and has a mode to output a start signal to one of said trigger circuits in association with release of said leading shutter curtain and to output another start signal to another of said trigger circuits in association with release of said trailing shutter curtain.

7. A flash control apparatus according to claim 6, wherein said control circuit has a mode to output start signals to said plurality of trigger circuits at different times during one shutter operation.

8. A flash control apparatus according to claim 6, wherein one of said synchro terminals is associated with a hot shoe.

9. A flash control apparatus, which is built in a camera body having a leading shutter curtain and a trailing shutter curtain, and which comprises:

a plurality of synchro terminals for connection, respectively, to a plurality of electronic flash devices;

an electronic flash device setting circuit which variably sets timing of triggering the electronic flash devices, said setting circuit being operative to changeably set an interval between respective triggering timings for successive light emissions by two of the plurality of electronic flash devices;

a control circuit which generates a corresponding plurality of start signals individually, in accordance with the timing set by said setting circuit, and having a plurality of output lines corresponding to said plurality of start signals; and a plurality of trigger circuits each electrically connecting one of said output lines to the corresponding synchro terminal and applying to the synchro terminal, in response to a start signal received on said one output line, a light emission signal to cause an electronic flash device connected to the synchro terminal to emit light, whereby the plurality of electronic flash devices emit light in accordance with the timing set by said setting circuit, wherein said control circuit additionally detects when successive frames are being photographed and has a mode to output a start signal to a different triggering circuit for each of the successive frames.

10. A flash control apparatus according to claim 9, wherein said plurality of trigger circuits is constituted by only two trigger circuits, and said control circuit has a mode to output start signals alternately to said two trigger circuits to effect photographing of a succession of frames with a different flash device for each frame.

* * * * *